(12) United States Patent
De Cuyper et al.

(10) Patent No.: US 10,647,080 B2
(45) Date of Patent: May 12, 2020

(54) HOLLOW PLASTIC OBJECT, PARTICULARLY PREFORM, RESP. CONTAINER, WITH A POLYMER BARRIER AND MANUFACTURING METHOD THEREOF

(71) Applicants: Dirk De Cuyper, Destelbergen (BE); William Dierickx, Destelbergen (BE); Tom Anthierens, Bruges (BE); Dirk Verlinde, Landskouter (BE); Resilux, Wetteren (BE)

(72) Inventors: Dirk De Cuyper, Destelbergen (BE); William Dierickx, Destelbergen (BE); Tom Anthierens, Bruges (BE); Dirk Verlinde, Landskouter (BE)

(73) Assignee: RESILUX, Wetteren (BE)

( * ) Notice: Subject to any disclaimer, the term of this patent is extended or adjusted under 35 U.S.C. 154(b) by 201 days.

(21) Appl. No.: 15/743,293

(22) PCT Filed: Jul. 10, 2016

(86) PCT No.: PCT/BE2016/000033
§ 371 (c)(1),
(2) Date: Jan. 10, 2018

(87) PCT Pub. No.: WO2017/008129
PCT Pub. Date: Jan. 19, 2017

(65) Prior Publication Data
US 2018/0200980 A1     Jul. 19, 2018

(30) Foreign Application Priority Data

Jul. 10, 2015  (BE) .................................. 2015/0199

(51) Int. Cl.
*B32B 1/02*        (2006.01)
*B29B 11/14*    (2006.01)
(Continued)

(52) U.S. Cl.
CPC ................ *B32B 1/02* (2013.01); *B29B 11/14* (2013.01); *B32B 27/08* (2013.01); *B32B 27/32* (2013.01);
(Continued)

(58) Field of Classification Search
CPC .......... B32B 1/02; B32B 11/14; B32B 27/40; B32B 27/32; B32B 27/08; B32B 27/36;
(Continued)

(56) References Cited

U.S. PATENT DOCUMENTS 766,486 A    8/1904  Barber
4,018,746 A   4/1977  Brinkmann
(Continued)

FOREIGN PATENT DOCUMENTS

EP    1081170 A2    3/2001
EP    1350806 A1   10/2003
(Continued)

*Primary Examiner* — Michael C Miggins
(74) *Attorney, Agent, or Firm* — James Creighton Wray

(57) ABSTRACT

The invention relates to a hollow article with rigid walls (18 98), surrounding an enclosed space (19, . . . , 99) that occupies the interior of the hollow article (10, . . . , 90), made of a primary plastic base material (1) in which there is provided a secondary plastic material (2), consisting of a polymer, characterized in that this secondary polymer (2) is formed by a first component (A), being a cyclic diisocyanate as a cyclic compound, with an aromatic or optionally an aliphatic structure, and by at least one additional component (B), wherein this secondary plastic material (2) forms a barrier (12, . . . , 92) in the hollow article (10, . . . , 90), and method for producing thereof.

20 Claims, 6 Drawing Sheets

(51) Int. Cl.
*B32B 27/40* (2006.01)
*B65D 1/02* (2006.01)
*B32B 27/32* (2006.01)
*B32B 27/08* (2006.01)
*B32B 27/36* (2006.01)
*C08L 67/02* (2006.01)
*C08L 75/04* (2006.01)
*B29C 49/06* (2006.01)
*B29K 75/00* (2006.01)
*B29C 51/00* (2006.01)
*B29C 49/00* (2006.01)

(52) U.S. Cl.
CPC .............. *B32B 27/36* (2013.01); *B32B 27/40* (2013.01); *B65D 1/0215* (2013.01); *C08L 67/02* (2013.01); *C08L 75/04* (2013.01); *B29B 2911/14986* (2013.01); *B29C 49/0005* (2013.01); *B29C 49/06* (2013.01); *B29C 51/002* (2013.01); *B29K 2039/00* (2013.01); *B29K 2075/00* (2013.01); *B29K 2995/0067* (2013.01); *B29K 2995/0069* (2013.01); *B32B 2307/412* (2013.01); *B32B 2307/518* (2013.01); *B32B 2307/546* (2013.01); *B32B 2307/714* (2013.01); *B32B 2307/7242* (2013.01); *B32B 2307/7246* (2013.01); *B32B 2439/00* (2013.01); *B32B 2439/60* (2013.01); *C08L 2203/10* (2013.01)

(58) Field of Classification Search
CPC ........ B32B 2439/60; B32B 2307/7246; B32B 2307/412; B32B 2439/00; B32B 2307/546; B32B 2307/518; B32B 2307/7242; B65D 1/0215; C08L 67/02; C08L 75/04; C08L 2203/10; B29C 49/06; B29C 51/002; B29K 2075/00; B29K 2995/0067; B29K 2995/0069; B29K 2039/00; B29B 2911/14986
See application file for complete search history.

(56) References Cited

U.S. PATENT DOCUMENTS

| | | |
|---|---|---|
| 8,822,001 B2 | 9/2014 | Akkapeddi |
| 2005/0009976 A1 | 1/2005 | Akkapeddi |
| 2006/0029822 A1 | 2/2006 | Brown |
| 2006/0029823 A1 | 2/2006 | Brown |
| 2011/0262688 A1 | 10/2011 | Akkapeddi |

FOREIGN PATENT DOCUMENTS

| | | |
|---|---|---|
| EP | 2082861 A1 | 7/2009 |
| EP | 2103640 A1 | 9/2009 |
| JP | 2014046678 A | 3/2014 |
| WO | 005099996 A1 | 10/2005 |

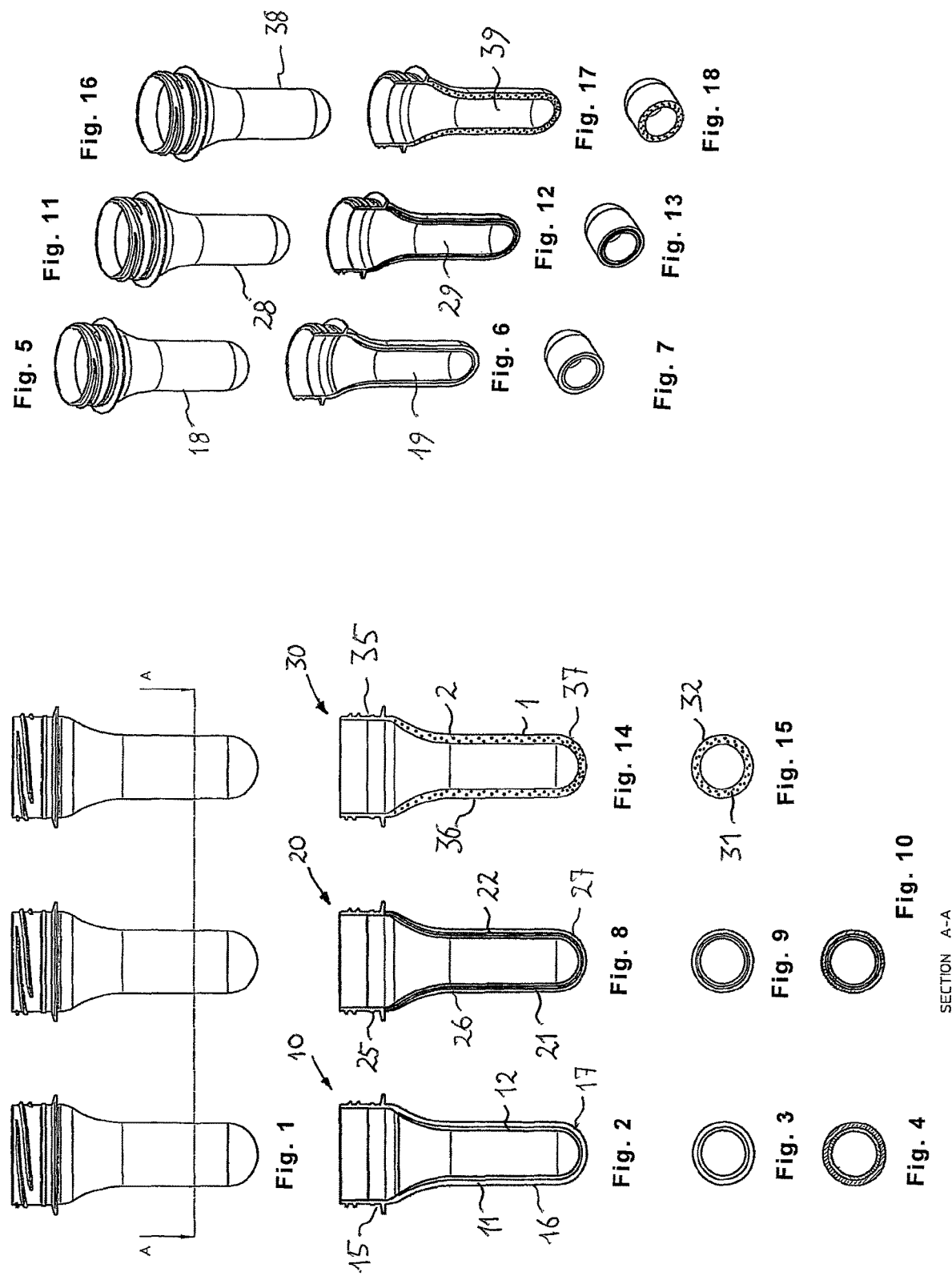

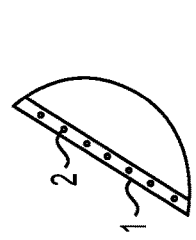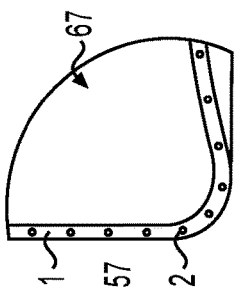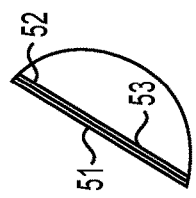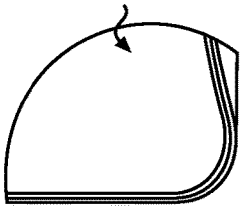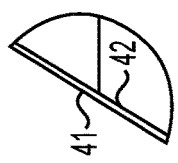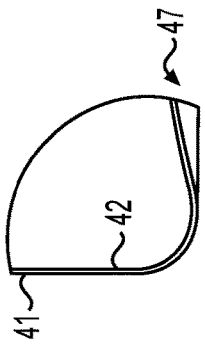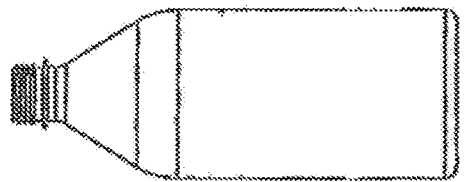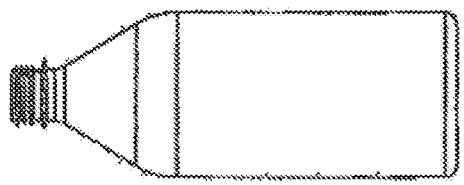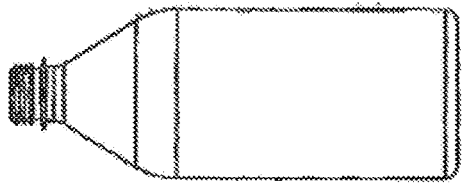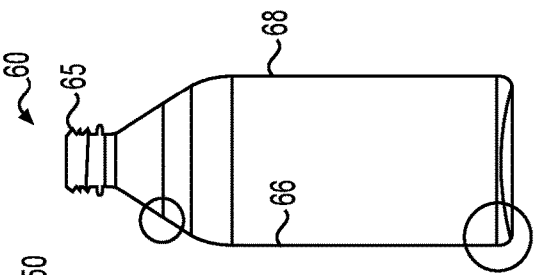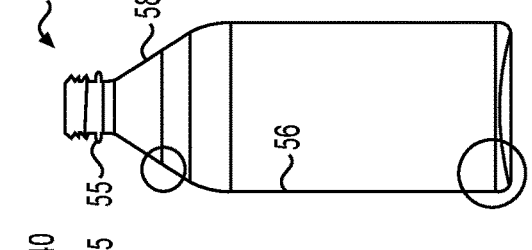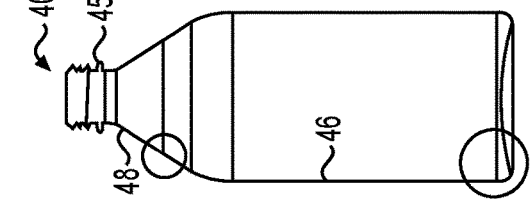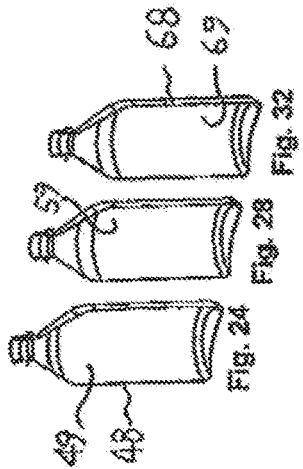

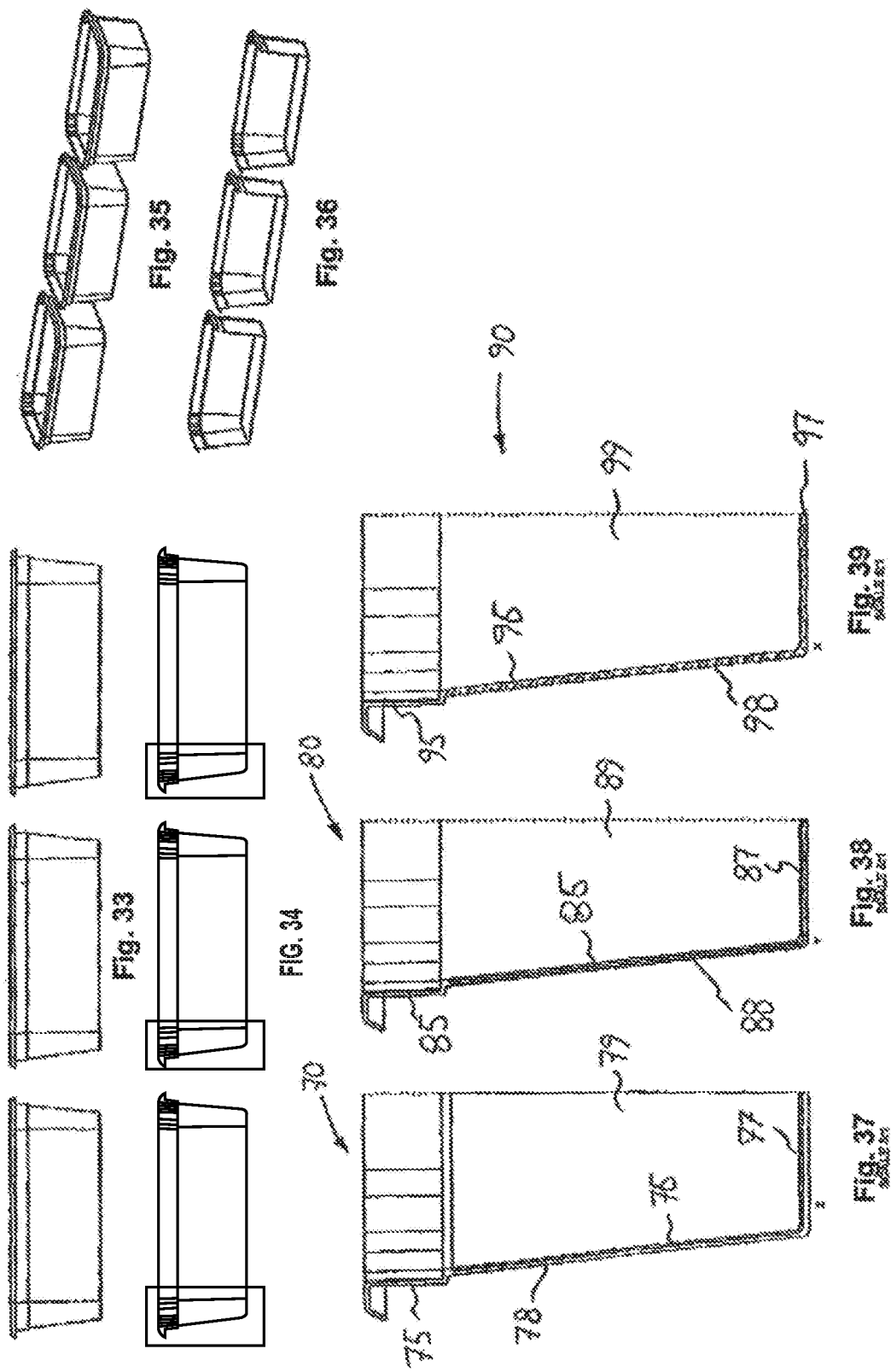

HOLLOW PLASTIC OBJECT, PARTICULARLY PREFORM, RESP. CONTAINER, WITH A POLYMER BARRIER AND MANUFACTURING METHOD THEREOF

FIELD OF THE INVENTION

The present invention relates to hollow articles made of plastic material with rigid walls, particularly of the preform type, notably for blow moulding thereof to make a container, which is provided with a barrier against undesired passage of particles.

BACKGROUND OF THE INVENTION

Nylon-MXD6 is a generally used plastic for obtaining a good gas barrier against oxygen and $CO_2$. In this respect, nylon-MXD6 is used as a barrier layer in PET preforms.

A first problem with nylon-MXD6 lies in its clarity or transparency, in the sense that this material loses its transparency when it absorbs water. This transparency is necessary however for a large number of applications, such as in preforms or containers on which flawless transparency requirements are frequently imposed. This loss of transparency is a first drawback of nylon-MXD6.

A further problem is with the adhesion properties, which are insufficient in the case of nylon-MXD6, which are even such that nylon-MXD6 cannot be used as a barrier material in preforms having polyolefins such as polyethylene and polypropylene as the primary base material, because of this adhesion problem of a barrier layer made of nylon-MXD6 vis-a-vis polyolefins. This limitation on material choice is an additional drawback of nylon-MXD6.

The known nylon-MXD6 also exhibits poor adhesion to PET. This means thus a limited use of PET as a primary base material, with an adverse consequence in terms of design freedom and container design.

A still additional problem is that nylon-MXD6 causes severe corrosion on the metal surfaces of injection moulding machines and moulds used in the injection moulding of preforms or other hollow articles. This corrosion results in high maintenance costs, since it causes the need to replace certain machines and mould parts.

Since nylon-MXD6 thus has certain drawbacks, alternatives lacking these drawbacks are being sought for a long time. These notably include other plastic materials consisting of meta-xylene-based polymers, having good gas barrier properties just like those of nylon-MXD6, but without the aforementioned drawbacks of nylon-MXD6.

Various patent publications disclose the structure of nylon-MXD6, as well as the good gas barrier that this forms, namely barriers exclusively against gases but no other components. However, this constitutes a limitation on this known material, because this means that such barriers cannot efficiently be used against other phases, notably water vapour, fluid etc.

PRIOR ART

Document EP 1.350.806 of MITSUBISHI thus indicates that nylon-MXD6 based and biaxially stretched polyamides have low permeability for gases. It also states that a clay, namely smectite, is added.

On the other hand, document U.S. Pat. No. 8,822,001 of Graham packaging company yet states that the addition of adhesion promoters counteracts the above-mentioned problem of undesirable delamination of a MXD6 layer from PET layers.

Document U.S. Pat. No. 4,018,746 of HOECHST states that the combination of metaxylene diamine with carboxylic acids results in clear plates, tubes or injection-moulded articles that have good technical properties. However, barrier properties are not mentioned therein.

Documents WO-2005099996 and U.S. Pat. No. 766,486 disclose a multi-layer system as a means against oxygen permeation through PET. The multi-layer system may consist of 3 layers with PET/nylon-MXD6/PET or also 5 layers with barriers, but again only against gases. The structures disclosed herein are also films, but not 3-D hollow articles with their predetermined shape, as envisaged here.

However, all these documents relate to MXD6, which has the above-mentioned drawbacks. Thus, a barrier is yet proposed, but the benefit of the barrier aimed at here must be considered as being strongly put at issue in view of the serious drawbacks of the above-mentioned material, nylon-MXD6. Therefore, the search for other barrier materials don't having these drawbacks was continued.

AIM OF THE INVENTION

The aim of the present invention is to remedy the above-mentioned drawbacks and shortcomings. Thus, one aim of this invention is to provide a hollow article of the above-mentioned type, especially the preform type for containers, which is provided with a barrier, incorporating therein a remarkably adapted plastic material.

The starting material herein is nylon-MXD6, since the structure thereof yet provides for the good gas barrier properties. It has the following structure:

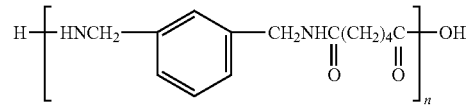

The starting point in this is the observation that this polymer is based on metaxylene diamine. Thus, the production of nylon-MXD6 starts from metaxylene diamine. Therefore it was sought whether good gas barrier properties might also be obtained with polymers other than nylon-MXD6, in which the aromatic part also contains the above-mentioned metaxylene, as is the case in nylon-MXD6.

SUMMARY OF THE INVENTION

It could be determined that this is notably the case with polymers that are the reaction product of MXDI (1,3-dimethylxylylene diisocyanate) with another material yet to be specified. The starting observation here is that MXDI has the following structure

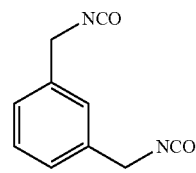

There is thus proposed according to this invention, a hollow article, made of a primary plastic base material with rigid walls surrounding an enclosed space that occupies the interior of the article, wherein a secondary material consisting of a polymer is provided. Remarkably, said secondary polymer is formed by a first component A, being a cyclic compound, more specifically a cyclic diisocyanate, with an aromatic or optionally an aliphatic structure, and by at least one additional component B, wherein this secondary plastic material forms a barrier in the article.

In this way, thanks to the present invention, an efficient barrier is incorporated into the hollow article, consisting of a suitable plastic material, wherein the specific structure thereof ensures the good barrier properties that are desired here, on the one hand, and eliminating the above-mentioned drawbacks, on the other hand, thus responding to a long-felt need, thanks to the development, provided by the present invention, of a suitable broader-spectrum barrier material, thereby deviating from the pathway traced in the prior art set out above.

In fact, thanks to the suitable selection of said secondary polymer as a barrier with the dual function of a previously unknown combination of efficient barrier function and at the same time, elimination of serious drawbacks, first including the risk of delamination, the adhesion of the secondary barrier layer made therefrom to the primary base layer is considerably better. Thanks to the use of this secondary barrier material, the barrier layer can thus be applied in the hollow article in a reliable manner, with a greatly reduced risk of delamination, which must be prevented at all costs.

In addition, it was found that the properties of the plastic of which the barrier of said hollow article, in particular the preform or container, is made, are enhanced as follows thanks to the present invention:

- in contrast to MXD6, this barrier polymer remains clear when it has absorbed the moisture;
- in case of moisture absorption, the plastic retains its barrier properties at least as well as before. The barrier properties may even be improved by water absorption;
- the plastic can become more flexible after absorbing water.

EXPOSURE OF THE INVENTION

This is especially applicable according to a first main embodiment of the hollow article according to the invention, which is remarkable in that the above-mentioned secondary plastic material has a structure that contains an aromatic ring structure, wherein the basis of the aromatic block is formed by MXDI, which is incorporated as a barrier element, wherein the barrier function is further enhanced.

According to a particular embodiment of the invention, said secondary plastics are formed by non-reactive polymers, by which the action of the barrier layer is even further enhanced in a broad range of applications. Indeed, the barrier layer is functionally optimised in its effect herewith in that the permeation of particles is efficiently blocked.

In contrast, document U.S. Pat. No. 8,394,501 of MITSUBISHI primarily discloses reactive polymers, still intended for use as plastic films. This is in contrast with the hollow articles primarily envisaged here, in terms of both structure, with their predetermined shape, and composition.

According to a preferred embodiment of the invention, said polymers consist of polyurethanes. Polyurethane is the reaction product of MXDI (1,3-dimethylxylylene diisocyanate) and diols, so that this targeted selection is based on the fact that good barrier properties are obtained with MXDI (1,3-dimethylxylylene diisocyanate), wherein it should be noted that polymers formed by said polyurethanes have the same aromatic ring structure as MXD6, i.e. metaxylene.

Depending on the type of diol, various polyurethanes with good barrier properties are formed, and even more not only against gas, but also against other phases such as vapours, thereby providing a broader spectrum of use thanks to the invention. This thus represents a significant improvement over the known combination of nylon-MXD6 as barrier material with the primary plastic base material, the more that nylon-MXD6 also has the numerous drawbacks mentioned above.

Thanks to polyurethanes, the adhesion of the secondary barrier layer made therefrom to the primary base layer is considerably better, even without adding adhesion promoters. Thanks to the use of this particularly suited secondary barrier material, the barrier layer can thus be applied in a reliable manner into the hollow article, with a greatly reduced risk of delamination, which must be prevented at all costs.

Yet another advantage of said polyurethanes is that they remain clear in case of water absorption, in contrast to the known nylon-MXD6. In this respect, perfect transparency is essential in quite many applications An additional advantage of said polyurethanes is the fact that they have a much lower melting point than nylon-MXD6 and can therefore suitably be used as an intermediate layer, partly thanks to this useful property here. This is the case for a hollow article with polyolefin as the primary base material, made by co-extrusion or even co-injection, which is an additional problem that bears an increased risk of delamination. Consequently, these secondary polymers proposed by the invention are an alternative to currently existing barrier materials, such as EVOH, which call for additional adhesion layers made of still other materials, in case they are introduced into polyolefins via co-injection or co-extrusion. An advantageous use of such barriers according to the invention is thus in combination with polyolefins as primary base material: these have a poor barrier effect against gases indeed, so that the inclusion of such a barrier according to the invention in this type of primary material with poor barrier characteristics—which consequently cannot serve here as such—also serves as an advantageous remedy against this deficiency. This also significantly increases the possible choices among the primary plastic base materials, which is an additional advantage of the secondary barrier, material according to the invention.

A remarkable advantage thereof in the application of multi-layered hollow articles, preforms or containers aimed at here, consists of that PET can be used effectively as the primary base material thanks to the solution proposed according to the invention, provided however that MXDI is introduced as a barrier layer via co-injection instead of the known nylon-MXD6, which is responsible for the delamination problem in this case.

Next, according to a further embodiment of the hollow article per the invention, it is specified that it is composed of a multi-layered structure. Within the primary layer, a secondary intermediate layer is thus provided, which is made of the above-mentioned secondary plastic, which is incorporated as a barrier layer. Due to this proposed embodiment of the invention, considerably less delamination occurs between the layers as a result, so that the earlier delamination problems from the prior art are solved herewith.

Document EP 1 081 170 B1 of MITSUI Chemicals, Inc. is limited to a dispersion of the polyurethane in water, so that it is thus clearly used only as a coating material. No contribution is made herein to solid 3D structures with a specific form, while PET nevertheless is highly suitable to great freedom of shape as a base material. Moreover, nothing is stated therein, regarding the use of cyclic compounds, in contrast to the invention presented, where this is an essential aspect.

In addition, corrosion does not occur with PU, since this does not contain the highly corrosive adipic acid.

According to another embodiment of the invention, so-called blends, obtained by blending, are used, in addition to the above-mentioned layer structure.

According to yet another preferred embodiment of the invention, the following type of polymers are considered, namely polyurethanes formed as a reaction product of MXDI+diols including the following groups of materials: aromatic block with ring structure+ethylene glycol; 1,3-propanediol; 1,4-butanediol; 1,5-pentanediol; 1,12-dodecanediol; diethylene glycol.

Depending on the type of diol, various polyurethanes are thus formed, with good or even outstanding barrier properties for some of them, more specifically among those mentioned above. In this respect, it could be determined that the barrier properties are best in the case of diols with a carbon chain length of between 3 and 10, especially between 4 and 6.

According to a further although less preferred embodiment of the invention, the following polyurethanes produced as reaction products of MXDI with diols including the following material groups are also considered: 1,3-butanediol; 1,2-propanediol; 1,6-hexanediol; 1,4-cyclohexane dimethanol; 1,9-nonanediol and/or 1,10-decanediol, by means whereof additional polyurethanes with acceptable barrier properties are thus formed.

According to a second main embodiment of the hollow article according to the invention, it is remarkable in that said secondary plastic material has a structure containing a ring structure that is aliphatic, wherein the aliphatic block is formed by CHDI, which is incorporated as a barrier element, wherein the cyclic compound with aliphatic ring structure is thus formed by CHDI, whereby the barrier function is enhanced as well. In this case of an aliphatic ring structure, it consists of CHDI, being hydrogenated xylylene diisocyanate, or C6XDI,

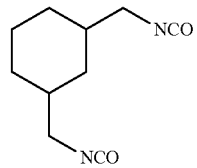

In this case according to the invention, such a secondary plastic material is incorporated as a barrier layer, wherein said corrosion is significantly reduced or even practically eliminated, since this secondary plastic material proposed according to the invention does not contain the extremely corrosive adipic acid, in contrast to nylon-MXD6.

According to yet another preferred embodiment of the invention, the following type of polymers also comes under consideration namely polyureas produced as a reaction product of MXDI with diamines. Depending on the type of diamine, various polyureas with good barrier properties are formed. Polymers formed based on said polyureas also contain the same aromatic ring structure as in nylon-MXD6, namely meta-xylylene.

With polyurea as well, the adhesion to primary base material is better than with nylon-MXD6, likewise without addition of adhesion promoters, which in turn has a favourable influence on the counteraction of delamination problems between adjacent layers in said multi-layered structure of the hollow article according to the invention.

Said polyureas also have a far lower melting point than nylon-MXD6 and can thus also be incorporated as a middle layer in a hollow article consisting of a polyolefin, such as a preform, via co-injection, in contrast to nylon-MXD6. As a result, these polyurea-based polymers are also an additional alternative for the current barrier materials, in which such a combination is unsuitable yet.

In contrast to nylon-MXD6, said polyureas remain clear upon water absorption, which may be a requirement in the case of hollow articles, especially in the preferred use here of preforms or transparent containers, more specifically when PET is selected as the primary base material, specifically because of its exceptionally good mouldability, which indeed is an particularly suitable property in the field of application of hollow articles with rigid walls that is relevant here.

In addition, corrosion is also less likely to occur with the polyureas, since they do not contain any adipic acid, which is yet extremely corrosive.

According to a preferred embodiment of the invention, polyureas containing diamines with a C-chain length of between 3 and 10 are selected, based upon the experimental statement that the barrier properties thereof are also the best with the aforementioned diamines, especially between 4 and 6.

In this regard, according to a more specific embodiment of the invention, polyureas are proposed starting from MXDI+diamines and polyamines, more particularly within the group of the following materials: ethylenediamine.

According to a still more specific but less preferred embodiment of the invention, polyureas are proposed starting from MXDI+diamines and polyamines, wherein the latter can possibly be selected optionally from among 1,3-aminopropane, 1,4-diaminobutane and 1,6-diaminohexane, in subsidiary order of preference.

According to a rather subsidiary embodiment of the invention, polyamides may also be possibly prepared starting from MXDI+dicarboxylic acids or polycarboxylic acids. MXD6 is also a polyamide, but is prepared from a metaxylene diamine (MXD)+dicarboxylic acid. However, MXD6 is not based on an isocyanate.

In addition to the hollow articles presented above which are provided with a passive barrier, an active barrier is presented below in a particular embodiment according to the invention, wherein said secondary and possibly also primary layer contains further additives with the same function of stopping the permeation of undesired particles.

A further particularly remarkable embodiment of the invention consists of the introduction of specific suitable additives, especially cobalt compounds, which have the property of functioning as a catalyst for promoting the oxidation reaction of permeating oxidizing particles with the secondary polymers of the plastic barrier, and even accelerating it, thus neutralizing the former particles. Thanks to these cobalt compounds, an extraordinary antioxidant effect of the active barrier thus produced is achieved.

According to a preferred embodiment of the invention, it consists of a preform for the blow moulding of a container, comprising a neck part and a bottom part, having between them a wall part that extends along its axis. In particular, it is made of a multi-layered structure of plastic materials, wherein—according to a further preferred embodiment of the preform according to the invention—the permeation of particles is advantageously blocked in both directions, thus both from inside to outside and from outside to inside.

But in an application envisaged here of multi-layered preforms, respectively containers or other hollow articles, thanks to the measure proposed according to the invention, PET can still be used as the primary base material yet, subject to the incorporation of MXDI as a middle layer via co-injection, as proposed according to the invention, instead of the known nylon-MXD6, which is problematic here.

Thus, a substantial contribution is made to the hollow articles aimed at with their solid structure and with a certain shape, wherein the base material, PET, is perfectly suited for a great freedom of shape indeed.

The present invention also relates to a final product as a container, especially by blow moulding thereof, notably from a preform as specified above.

The present invention also relates to a method for generating a barrier plastic in a hollow article, particularly a preform or a container of the above-mentioned type, wherein the reaction for forming the barrier plastic with the various monomers can be conducted as follows: according to a first embodiment of the method according to the invention, the monomers are placed together in an anhydrous solvent, in which the formation of the plastic takes place. Solvents that may be used are DMF or ethyl acetate, with DMF being dimethylformamide.

In order to ensure the good progress of the reaction, a catalyst may be necessary, notably a Sn or Ti complex. The atmosphere above the mixture should be anhydrous and acid-free. Possible gases that may be used are argon (Ar) or nitrogen ($N_2$). The polymerisation should be continued until the said plastic has a molar mass >20 kD, especially 50 kD. After the reaction, this plastic should precipitate and can be purified. The advantage of this method of polymerization is that the reaction temperature can be better controlled.

According to a second embodiment of the method according to the invention, the monomers may also react with one another directly, thus without a solvent, to form the above-mentioned plastic. If need be, a catalyst may be used here. The advantage of this method is that the polymer no longer needs to be purified, or only to remove the catalyst if this is used. One important aspect of this method is the availability of good equipment for keeping the temperature under control or allowing the reaction to proceed well, subject to the use of suitable temperature control.

With both mentioned embodiments of the method according to the invention, the desired polymer can be produced directly, intended for the above-mentioned barrier. However, it is also possible to prepare intermediate forms of the polymer in the form of oligomers, which are converted in a second step via reactive extrusion to the polymer with the desired molar mass, fabricated for the intended barrier.

According to a further embodiment of the method according to the invention, in addition to the use of MXDI or CHDI as the basis, still other diisocyanates may be used. The basis is that they contain a ring structure, especially of the $C_6$ type, both aromatic and aliphatic, such as methylene diphenyl diisocyanate, as an extension of diisocyanate monomers.

The present invention also relates to a method for producing a hollow article, notably a preform or container, as specified above, with the introduction of a secondary plastic barrier into a multi-layer preform by co-injection, in that case in the form of a secondary intermediate layer that is incorporated into a primary layer thereof.

According to an alternative method for producing said preforms or containers, the above is achieved by using overmoulding through the insertion of a primary, respectively secondary preform, having as particular benefit an improved chemical resistance when the filling product comes into direct contact with the container.

According to a further alternative method for producing said preform or container, it is achieved by blending, thereby preparing so-called blends, notably one mass virtually homogeneous consisting of a mixture of primary and secondary material, which notably makes it possible to use a less expensive material as the primary material along with the usual one as a secondary material, mainly for cost reasons, to save money.

Thanks to the above-mentioned methods according to the invention, a good barrier can be obtained in the containers, not only against gas but also other undesirable particles such as moisture or vapour. Consequently, the field of use has been remarkably extended thanks to the invention.

Further features and properties of the present invention are defined in further subclaims.

Further details and particulars will appear from the following description of some exemplary embodiments of the materials according to the invention and the uses thereof, explained more in detail based on the appended drawings, wherein the same reference numbers relate to the same or analogous elements.

BRIEF DESCRIPTION OF THE DRAWINGS

FIG. 1 shows a general schematic representation of an embodiment of a preform according to the invention in a side view.

FIGS. 2 to 7 show schematic representations of a first embodiment of a preform according to the invention, specifically longitudinal and transverse sections thereof, a cross-sectional view along line A-A, and a perspective view.

FIGS. 8 to 13 show schematic representations of a second embodiment of a preform according to the invention, as in the previous group of figures.

FIGS. 14 to 18 show still analogous schematic representations of a third embodiment of a preform according to the invention as in both previous groups of figures.

FIGS. 19 to 32 show schematic representations of three analogous embodiments of a possibly corresponding container according to the invention, possibly derived from the above-mentioned preform shown in the previous corresponding figures, specifically in side view, in longitudinal and transverse sections thereof, a cross-sectional side view along line A-A, and a perspective view.

FIGS. 33 to 39 show schematic representations of various embodiments of a hollow article according to the invention in the packaging type in general, specifically in side view, in longitudinal and transverse sections thereof, a cross-sectional view along line A-A, and a perspective view.

DESCRIPTION

Figure 40:
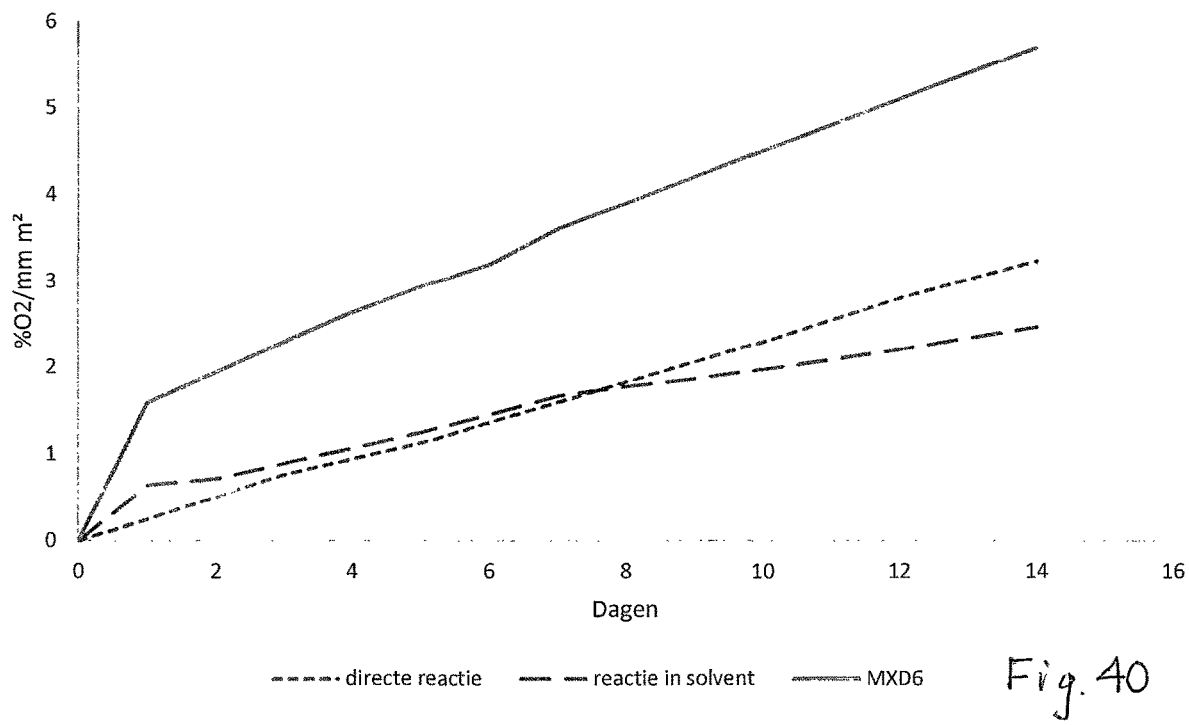
FIG. 40 shows a graphical representation of the barrier effect for oxygen at various percentages as a function of time in number of days for a series of plastic materials according to the invention compared to a reference material, MXD6, each of which is shown in a separate curve labelled as sample i, where i ranges from 7 to 16.

In general, this invention relates to a hollow article 70, 80, 90 with rigid walls, as specifically represented as a packaging in FIGS. 33 to 39, largely composed of a primary plastic base material being a first type of plastic, namely the base polymer. Within this primary plastic base material, a secondary plastic material is provided, consisting of a polymer having a ring structure, which is advantageously aromatic. Here the aromatic ring structure is also made of MXDI (metaxylene diisocyanate) as a basis. The structure of the latter polymer provides for good barrier properties due to the incorporation of an improved barrier material.

A variant thereof is formed by a ring structure, which is aliphatic, wherein the aliphatic ring structure consists of CHDI (hydrogenated xylylene diisocyanate or C6XDI).

Said secondary plastic material is a second polymer type that, when combined with the base polymer, imparts better properties to the hollow article, especially keg container 70, 80, 90 than if the hollow article were made with the base polymer alone.

Said hollow article 90 may be composed of a so-called blend obtained by blending the secondary and primary plastic materials together. FIG. 36, resp. 8 shows an example of an alternative thereto, consisting of a multi-layered article 80 or preform 10 comprising a primary base layer 81 within which a secondary plastic material 82 is provided.

Some specific application examples are given below, which were subjected to a first series of tests, wherein the oxygen permeation through polymeric materials was measured. These are shown in the corresponding graphics, in the first instance for polyurethane based on MXDI. The polymer used here is also indicated, and the behaviour of each material is also shown.

Figure 41:
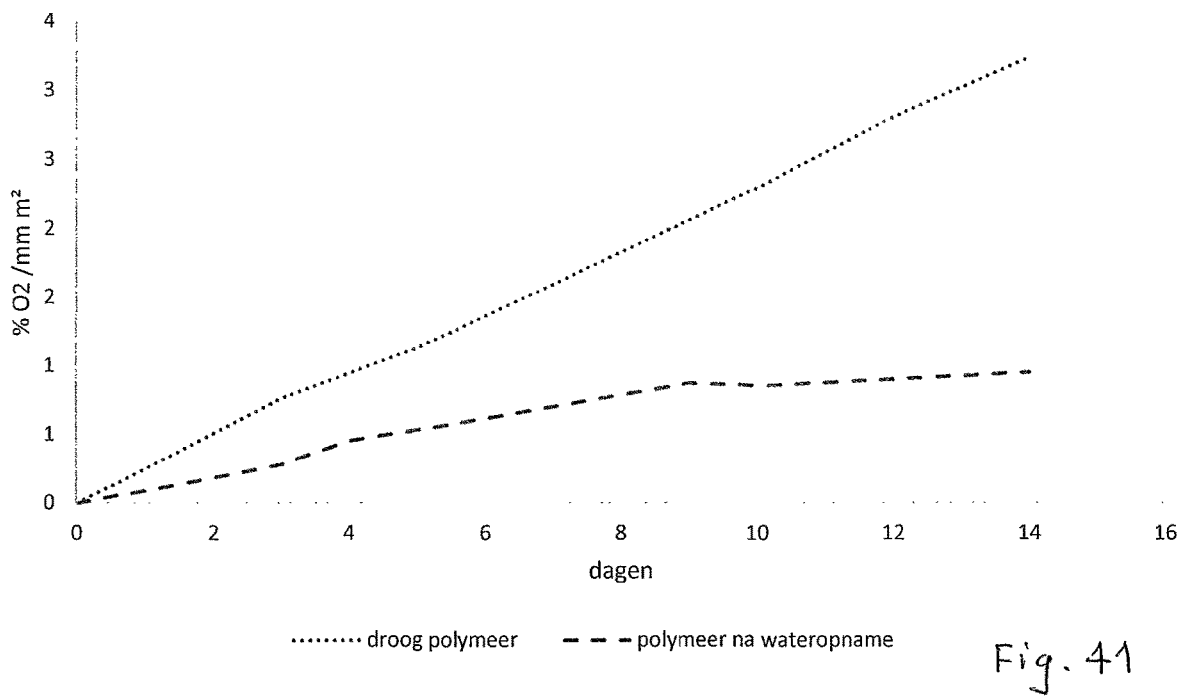
FIG. 41 shows another graphical representation analogous to the previous FIG. 40, but in greater detail for the best ones among the series of plastic materials according to the invention.
Figure 42:
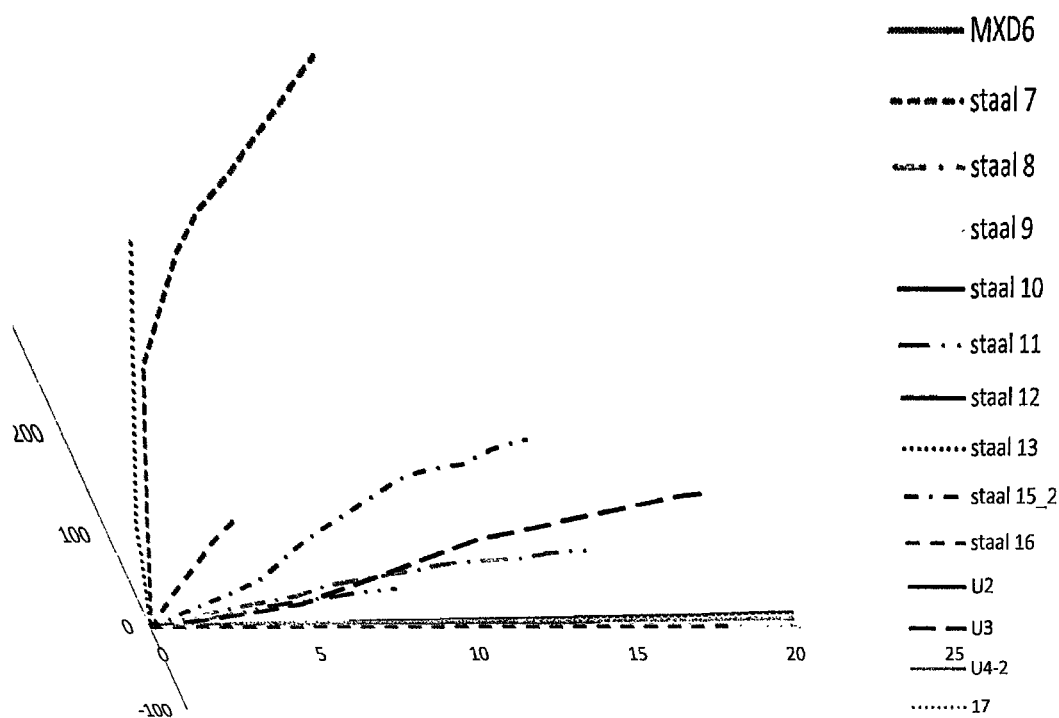
FIG. 42 shows a still further graphical representation thereof.
Figure 43:
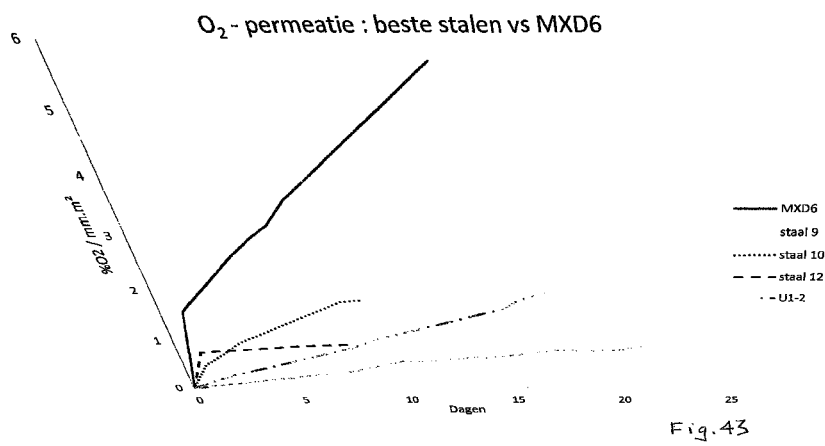
FIG. 43 shows a graphical representation of barrier results in the case of production of plastic according to the method of the invention in solvent versus production without solvent.
Figure 44:
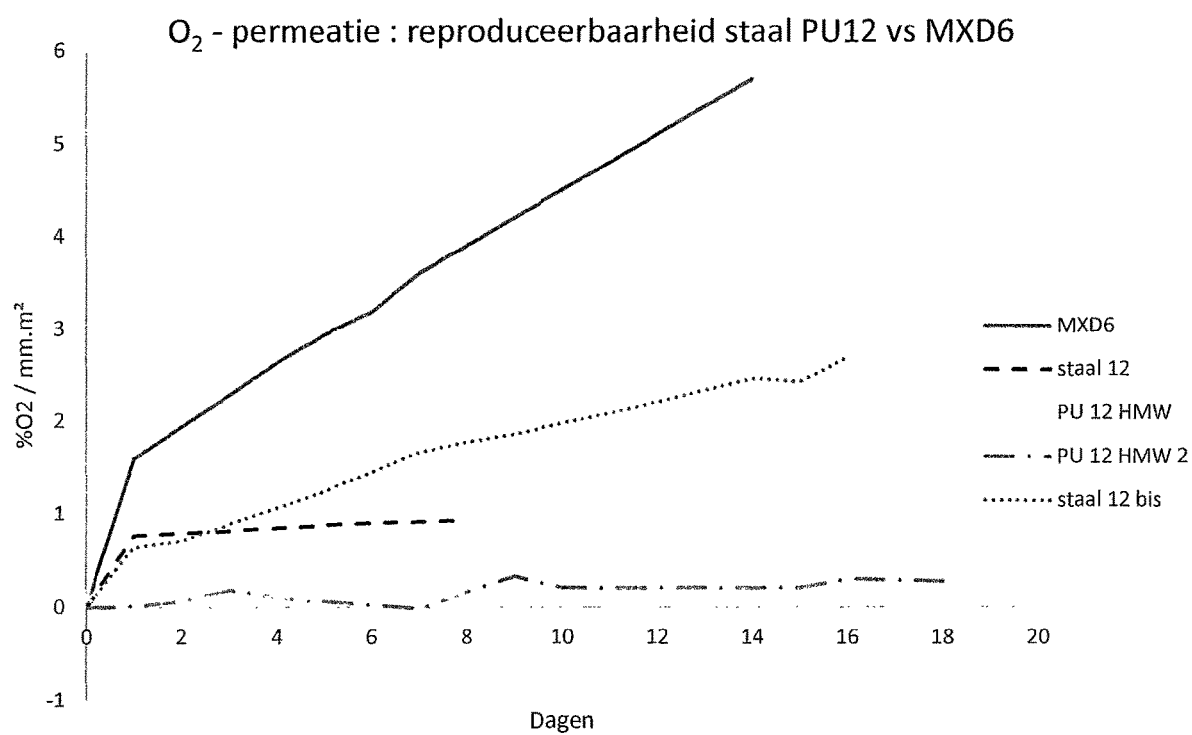
FIG. 44 shows a further graphical representation of barrier results analogous to the previous FIG. 43, but comparing dry plastic to plastic after water absorption.

The data are presented in the corresponding graphics from FIGS. 40 to 44. From tests on the basis whereof these graphics were derived, it can be concluded that linear chains originating from the diols gave good results.

In addition, it can be noted that there is an optimal chain length for diol with good barrier properties. It may presumably be comprised between $C_3$ and $C_{10}$, with an optimum around $C_6$, which is visible in the corresponding graphics from the figures. However, the chain length formed by $C_{12}$ is too long and $C_2$ is too short owing to the brittleness and flexibility, respectively, of the materials.

FIGS. 1 to 18 show a preform as a prominent use of a hollow article 10, 20, 30, intended for blow moulding of a container. For this purpose, it is particularly composed of a biaxially stretchable plastic material for making a plastic container, for example 40, 50 or 60 of the type shown in FIGS. 19 to 32. The preform 10, 20, 30 can thus consist of an injection-moulded article.

More specifically, FIG. 2 shows the preform 10 with a neck part 15 and a bottom part 17, with a wall part 16 between them, extending along the axis 1 thereof.

FIGS. 8 to 13 show a preform 20 made up of a multi-layered structure comprising a primary base layer 21, wherein a secondary barrier layer 22 is provided, made up of said secondary polymer mentioned, for example a three-layer structure, wherein the base layer 21 is composed of a primary plastic material and the barrier layer forms a passive barrier, through which unwanted particles are blocked. The melt of the proposed secondary polymers is to be applied herein by means of injection, particularly co-injection, as visible in FIG. 8.

The above-mentioned barrier may also form a passive barrier against moisture or vapours. The secondary plastic material is a second polymer type that, when combined with the primary base polymer, imparts better properties to the preform 20 than if the hollow article preform were made with the base polymer alone.

FIG. 2 shows a variant of an embodiment consisting of an overmoulding preform 10, comprising two different materials, with an inner and an outer preform 11, 12, wherein one of them forms a secondary barrier layer 22. Similarly, the secondary plastic material is a second polymer type that, when combined with the primary base polymer, imparts better properties to the preform 10 than if this preform were made with the primary base polymer alone.

The preform 30 is also composed of a so-called blend, obtained by blending the secondary and primary plastic materials together. FIG. 14 shows the example of such a variant thereof, here consisting of a monolithic preform 30 that can be made virtually homogeneously, i.e. without multilayers.

Thus, the barrier 22 can also be incorporated herein by overmoulding, or 32 by blending.

Tests and Examples

Some specific application examples are given below; which were subjected to a first series of tests, wherein the oxygen permeation through polymeric materials, was measured. These are shown in the corresponding graphics, in the first instance for polyurethane based on MXDI. The polymer used here is also indicated, and the behaviour of each material is also shown.

The $T_g$ of the barrier polymers, which ranges between 30 and 100° C., however, is comparable with that of nylon-MXD6, being about 85° C. This means that when blowing of PET bottles with a middle layer made of the secondary polymers, the PET and the secondary polymers can be blown at the same normal blowing temperature.

MXDI or 1,3-dimethylxylylene diisocyanate is used as the base:
primarily, the composition of the polyurethanes is further a reaction product thereof with diethylene glycol, 1,3-propanediol, 1,4-butanediol, 1,5-pentanediol.

Other compositions of the polyurethanes in decreasing order of preference are a reaction product thereof with 1,12-dodecanediol, diethylene glycol, 1,3-butanediol, 1,2-propanediol, 1,6-hexanediol, 1,4-cyclohexane dimethanol, 1,9-nonanediol and/or 1,10-decanediol.

As far as the polyurea is concerned, it can be advantageously described similarly as being a reaction product thereof with ethylenediamine.

Other compositions of the polyurethanes in decreasing order of preference are a reaction product thereof with 1,3-aminopropane, 1,4-diaminobutane and/or 1,6-diaminohexane.

Regarding the properties of the secondary plastic, they are as follows: in contrast to MXD6, this barrier polymer remains clear when it has absorbed the moisture; in case of moisture absorption, the plastic keeps its barrier properties at least even well. The barrier properties may even be improved by water absorption; the plastic can become more flexible after absorbing water.

These properties are apparent from the results of the following tests, which are shown in the corresponding Figure, which presents the barrier results for polymers being made in solvent vs. produced without solvent.

In a method for making a barrier polymer structure, the reaction for forming the barrier polymer with the various monomers takes place as follows: the monomers can be put together in an anhydrous solvent, in which the formation of the polymer takes place. Solvents that may possibly be used are DMF or ethyl acetate. For the good progress of the reaction, a catalyst (Sn or Ti complex) may be necessary. The atmosphere above the mixture should be anhydrous and oxygen acid-free. Possible gases that may be used are argon (Ar) or nitrogen ($N_2$). The polymerisation should be continued until the plastic has a molar mass that is greater than 20 kD, especially 50 kD (kiloDalton). After the reaction, the polymer will precipitate and can be purified. The advantage of this method of polymerization is that the reaction temperature can be better controlled.

However, the monomers may also react with one another directly, thus without a solvent, to form the above-mentioned plastic. A catalyst may be necessary or not. The advantage of this method is that the polymer no longer needs to be purified, unless simply to remove the catalyst. It is important in this method to have good equipment available for keeping the temperature under control or to properly control the reaction.

With the two above-mentioned methods the desired polymer can be prepared directly. However, it is also possible to make intermediate forms of the polymer—oligomers— which are converted in a second step via reactive extrusion to the polymer with the desired molar mass.

In addition to the use of MXDI or CHDI as the base, other diisocyanates may be used. In the expansion of diisocyanate monomers, the basis is that these contain a $C_6$ ring, which may be both aromatic and aliphatic. An example is methylene diphenyl diisocyanate.

The invention claimed is:

1. A hollow article with rigid walls, surrounding an enclosed space that occupies the interior of the hollow article, made of a primary plastic base material in which there is provided a secondary plastic material, consisting of a polymer, wherein this secondary polymer is formed by a first component A, being a cyclic diisocyanate as a cyclic compound, with an aromatic or optionally an aliphatic structure, and by at least one additional component B, wherein this secondary plastic material forms a barrier in the hollow article, wherein said secondary plastic material is formed by polyurethane.

2. The hollow article according to claim 1, wherein said cyclic compound with an aromatic ring structure is formed by MDI (methylene diphenyl diisocyanate).

3. The hollow article according to claim 1, wherein said cyclic compound contains a $C_n$ ring, notably a $C_6$ ring.

4. The hollow article according to claim 1, wherein said polyurethane is formed from a reaction of said aromatic or possibly aliphatic diisocyanate+a diol, wherein the latter is selectable from diethylene glycol, 1,3-propanediol, 1,12-dodecanediol, 1,3-butanediol, 1,2-propanediol, 1,6-hexanediol, 1,4-cyclohexane dimethanol, 1,9-nonanediol and/or 1,10-decanediol.

5. The hollow article according to claim 1, wherein said secondary plastic material has a ring structure that is aliphatic, wherein the aliphatic block is formed by CHDI (hydrogenated xylylene diisocyanate), incorporated as a barrier element.

6. The hollow article according to claim 1, wherein said primary plastic base material is selected from the polyester family, particularly wherein said primary plastic base material is selected from PET (polyethylene terephthalate).

7. The hollow article according to claim 1, wherein said primary plastic base material is selected from the polyolefin family, particularly wherein said primary plastic base material is selected from among the polyethylenes or polypropylenes, respectively.

8. The hollow article according to claim 1, wherein it has a multi-layer structure, especially a three-layer structure consisting of the base layer that is made of a primary plastic material and in which a barrier layer, especially a passive barrier, is included, which is made of a secondary plastic material that blocks unwanted components.

9. The hollow article according to claim 1, wherein said secondary plastic material has a structure containing an aromatic ring structure, wherein the aromatic block is also formed as a base by MXDI (1,3-dimethylxylylene diisocyanate), which is incorporated as a barrier element.

10. The hollow article according to claim 9, wherein said secondary plastic material is formed by a non-reactive polymer.

11. The hollow article according to claim 10, wherein said polyurethane is formed from a reaction of said aromatic or optionally aliphatic diisocyanate+a diol, wherein the latter is selectable from 1,4-butanediol, 1,5-pentanediol and/or diethylene glycol.

12. The hollow article according to claim 1, wherein additives are added to said secondary plastic material, and/or to the primary base material.

13. The hollow article according to claim 12, wherein adhesive promoters with an adhesive function are added to said secondary barrier material, wherein the adhesion of the materials is enhanced.

14. The hollow article according to claim 1, wherein it consists of a preform for blow moulding a container, comprising a neck part, a bottom part, with a wall part between them, extending along the axis € thereof, particularly wherein it is composed of a biaxially stretchable plastic material for manufacturing a plastic container.

15. The hollow article according to claim 14, wherein said preform consists of an injection moulded piece.

16. The hollow article according to claim 14, wherein it consists of an overmoulding preform, possibly comprising two different materials, possibly with an inner and an outer preform.

17. A method for manufacturing a hollow as a preform for container according to claim 14, wherein the reaction for forming the barrier polymer with various monomers proceeds with the following step: the monomers are placed together in an anhydrous solvent, in which the formation of the secondary plastic material takes place.

18. The method according to claim 17 for producing a hollow article, notably a preform respectively container, wherein the secondary plastic is introduced into the preform either by co-injection or by overmoulding or by blending, and thereby generating a plastic barrier against undesirable components, such as liquid or vapour among others, forming in the preform, respectively container.

19. A method for manufacturing a hollow article according to claim 1, wherein the reaction for forming the barrier polymer with various monomers proceeds with the following step: the monomers are placed together in an anhydrous solvent, in which the formation of the secondary plastic material takes place.

20. The method according to claim 19, wherein the polymerisation reaction is carried on until the polymer gets a molar mass which is greater than 20 kD, particularly >50 kD, wherein after the reaction, the polymer is precipitated and is further purified.

\* \* \* \* \*